United States Patent [19]
Dunn et al.

[11] Patent Number: 5,973,871
[45] Date of Patent: *Oct. 26, 1999

[54] DISK DRIVE ADAPTABLE FOR MULTIPLE OPERATING VOLTAGES

[75] Inventors: Paul F. Dunn, Longmont; Randall C. Bauck, Boulder, both of Colo.

[73] Assignee: Maxtor Corporation, Longmont, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/080,353

[22] Filed: Jun. 21, 1993

[51] Int. Cl.⁶ .................................................. G11B 15/18
[52] U.S. Cl. .......................... 360/69; 360/60; 360/78.04; 360/78.06; 360/78.07
[58] Field of Search .............................. 360/78.06, 78.07, 360/78.04, 69, 60, 55; 307/356, 497, 501

[56] References Cited

U.S. PATENT DOCUMENTS

| | | | |
|---|---|---|---|
| 4,636,905 | 1/1987 | Morimoto et al. | 360/69 X |
| 4,931,889 | 6/1990 | Osafune | 360/78.06 X |
| 4,991,129 | 2/1991 | Swartz | 360/69 X |
| 5,214,316 | 5/1993 | Nagai | 307/356 X |

*Primary Examiner*—Aristotelis M. Psitos
*Assistant Examiner*—Dan I. Davidson
*Attorney, Agent, or Firm*—David M. Sigmond

[57] ABSTRACT

A disk drive system that functions at various different power supply voltage levels includes a reset generator for resetting the disk drive in response to a predetermined reset condition dependent upon a drop in the power supply voltage. An adapter circuit coupled to the reset generator produces the reset condition by applying a multiplier to the supply potential of the system to establish a predetermined voltage at a reset node. The adapter circuit includes a switching means for selecting the multiplier based upon the particular mode of operation desired. The mode of operation is selected based upon an expected operating range of the power supply potential. A logic device is coupled to the adapter circuit to determine the particular mode of operation and for monitoring the current operating supply potential. The logic device is coupled to the switching means to change the multiplier in accordance with the particular mode of operation selected, as the supply potential varies through an expected operating range.

15 Claims, 1 Drawing Sheet

DISK DRIVE ADAPTABLE FOR MULTIPLE OPERATING VOLTAGES

FIELD OF THE INVENTION

The invention relates generally to the field of magnetic recording systems. More specifically, the invention relates to circuits and systems useful for operating disk drives under different power supply conditions.

BACKGROUND OF THE INVENTION

The clear trend in the computer industry today is toward the further development of portable computer systems. For example, notebook computers, laptop computers, and pen-based portable computers are becoming increasingly popular and have already enjoyed widespread success in the marketplace. In many cases, these computer systems are designed to operate utilizing a power supply potential generated by a battery. Because of the continuous power drain associated with battery-powered systems there has been an emphasis on developing circuits and systems which are either capable of operating at reduced power levels, or which feature a low-power mode of operation. Disk drive systems are presently manufactured to operate at voltages of either 3.0 or 5.0 volts.

One of the problems that arises in disk drive systems is that the performance of the drive changes radically as the power supply voltage fluctuates. Typically, when the power supply voltage level drops, the amount of current that can be supplied to the actuator decreases correspondingly. This results in longer access times due to the shortage of available power when performing a seek operation. Even though many servo circuits in a disk drive are capable of operating within a power supply voltage range of 3.0 to 5.0 volts, most disk drive systems are generally limited to operating under a specific power supply voltage matched to a predetermined set of seek and reset parameters.

For example, if a rigid-disk drive is intended to be operated with a 5.0 volt power supply voltage, the seek and reset parameters of the drive will normally be specified based upon the amount of current available with a 5.0 volt supply level. If the supply voltage drops below a certain minimum level (e.g., 4.2 volts) a reset condition is generated to disable the drive. This places a serious limitation on portable computer systems since it is often desired to continue computing—albeit with reduced performance parameters—even though the voltage of the drive has dropped below the normal reset voltage associated with the 5.0 volt supply potential. In other words, it is desirable to have a disk drive system adaptable to multiple supply voltages, or that could adjust its performance dynamically in accordance with variations to the operating power supply potential. Such a drive would be able to sense supply potential changes within an expected operating range and adjust its seek and reset parameters accordingly. This would enable the disk drive to continue operating under power supply conditions that would normally cause prior art drives to either malfunction or experience destructive breakdown.

SUMMARY OF THE INVENTION

A circuit solution to the aforementioned problems is described which allows a disk drive system to function at various different power supply voltage levels. In addition, the system of the present invention permits the disk drive to dynamically adapt to changes in the operating supply potential to maximize the performance of the disk drive system.

In one embodiment, the system of the present invention comprises a reset generator for resetting the disk drive in response to a predetermined reset condition dependent upon a drop in the power supply voltage. An adapter circuit is coupled to the reset generator to produce the reset condition. The adapter circuit does this by applying a multiplier to the supply potential of the system to establish a predetermined voltage at a reset node. The adapter circuit includes a switching means for selecting the multiplier based upon the particular mode of operation desired. The mode of operation is selected based upon an expected operating range of the power supply potential. For example, the drive may be configured to operate in a mode wherein 5V seek and reset parameters are utilized during normal power conditions, and 3V parameters are utilized as the supply voltage decays as a result of extended battery use.

The invention further comprises the use of a logic device coupled to the adapter circuit to determine the particular mode of operation and for monitoring the current operating supply potential. The logic device is coupled to the switching means to change the multiplier in accordance with the particular mode of operation selected, as the supply potential varies through an expected operating range. By way of example, depending upon the particular mode of operation selected, the disk drive system of the present invention could adjust the reset and seek parameters of the drive to reconfigure the drive as the operating supply potential of the drive changes as a function of time.

BRIEF DESCRIPTION OF THE DRAWINGS

The novel features believed characteristic of the invention are set forth in the appended claims. The invention itself however, as well as other features and advantages thereof, will be best understood by reference to the description which follows, read in conjunction with the accompanying drawings, wherein:

DETAILED DESCRIPTION

A disk drive system which is adaptable for operation with different power supply voltage levels is described. In the following description, numerous specific details are set forth, such as specific circuit schematics, resistor values, device types, etc., in order to provide a thorough understanding of the present invention. It will be obvious, however, to one skilled in the art that these specific details need not be used to practice the present invention. In other instances, well-known circuits and structures have not been shown in detail in order to avoid unnecessarily obscuring the present invention.

Normally, rigid-disk drive recording systems are designed to operate at a single specified power supply voltage. For example, if a drive were intended to operate at a supply voltage of 5.0 volts, any deviation from this voltage beyond a certain range (i.e., typical tolerance limits are ±15%) can cause a malfunction of the system. Thus, the majority of disk drive systems specifically designed for operation with a 5V supply potential are restricted to operating potentials in the range of about 4.2 to 6.0 volts. If the supply potential drops below the lower voltage level limit (e.g., 4.2–4.5V) the disk drive system is automatically disabled or reset.

Figure 1:
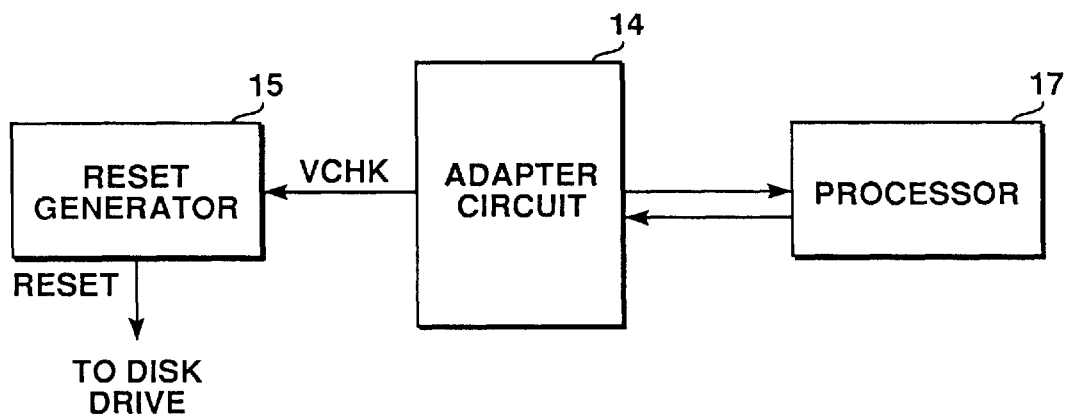
FIG. 1 is a block diagram of the disk drive system of the present invention.

In accordance with the invention, a disk drive system is presented which is auto-configurable for different power supply voltages. With reference to FIG. 1, the disk drive system of the present invention includes a processor 17 which communicates with an adapter circuit 14. Adapter circuit 14 provides a voltage signal, labeled $V_{CHK}$, to a reset generator circuit 15. Reset generator circuit 15, in turn, generates a reset condition for the disk drive as determined by the voltage at the $V_{CHK}$ input. By way of example, if $V_{CHK}$ is greater than a predetermined voltage level (e.g., 2.0 volts), then the drive operates normally. However, if $V_{CHK}$ drops below the predetermined voltage level then the drive is held in a reset state.

The $V_{CHK}$ voltage is generated by adapter circuit 14 as a function of the power supply voltage. In one embodiment, the $V_{CHK}$ voltage is generated by applying a constant multiplier (which is <1.0) to the supply voltage. It should be understood that the desired reset voltage for a 3V system needs to be a different percentage of the supply voltage than for a 5V system, so that a different multiplier must be generated (assuming that the 5V operating reset voltage is greater than the 3V operating voltage). In a current embodiment, two supply voltage levels are accommodated. These two power supply voltage levels are 3.0 volts and 5.0 volts. It is appreciated, however, that other voltage levels can be accommodated by the present invention. Moreover, the disk drive system of the present invention is not limited to operation with only two different supply voltages. That is, the invention can be adapted for operation at numerous different supply levels.

As stated earlier, the present invention comprises a disk drive system having the capability of working with different power supply potentials, e.g., either 3.0 or 5.0 volts. This capability makes the present invention ideally-suited for operation in portable computers in which battery decay below standard operating values normally occurs as a function of time. For example, consider a situation in which a portable computer system is powered by a 5.0 volt operating supply potential supplied from a rechargeable battery. As the battery wears down it eventually decays below a minimum acceptable operating voltage range. At this point, the invention functions to automatically reconfigure the drive for a low-power mode of operation. In the low-power mode of operation, both the reset and seek parameters of the drive are adjusted in correspondence to the lower available power. By maintaining the operation of the disk drive system (albeit, at a reduced performance level)—as opposed to resetting or otherwise shutting down the computer system—the usefulness of the computer system is extended beyond the achievable limits of prior art systems. In a typical prior art system, once the voltage on the power supply lines drops below approximately 4.2 volts, the entire system is disabled.

Now let us consider the converse situation. Assume that the disk drive system has been originally designed and configured for operation with a 3.0 volt power supply potential. If the situation arose wherein the supply potential was increased to a higher voltage level, say 5.0 volts, then the present invention allows the user to utilize the increased available power to maximize the seek performance of the disk drive system. In other words, due to the increase in available current, the drive could reconfigure itself by adjusting its seek and reset parameters consistent with a 5V operating level.

Figure 2:
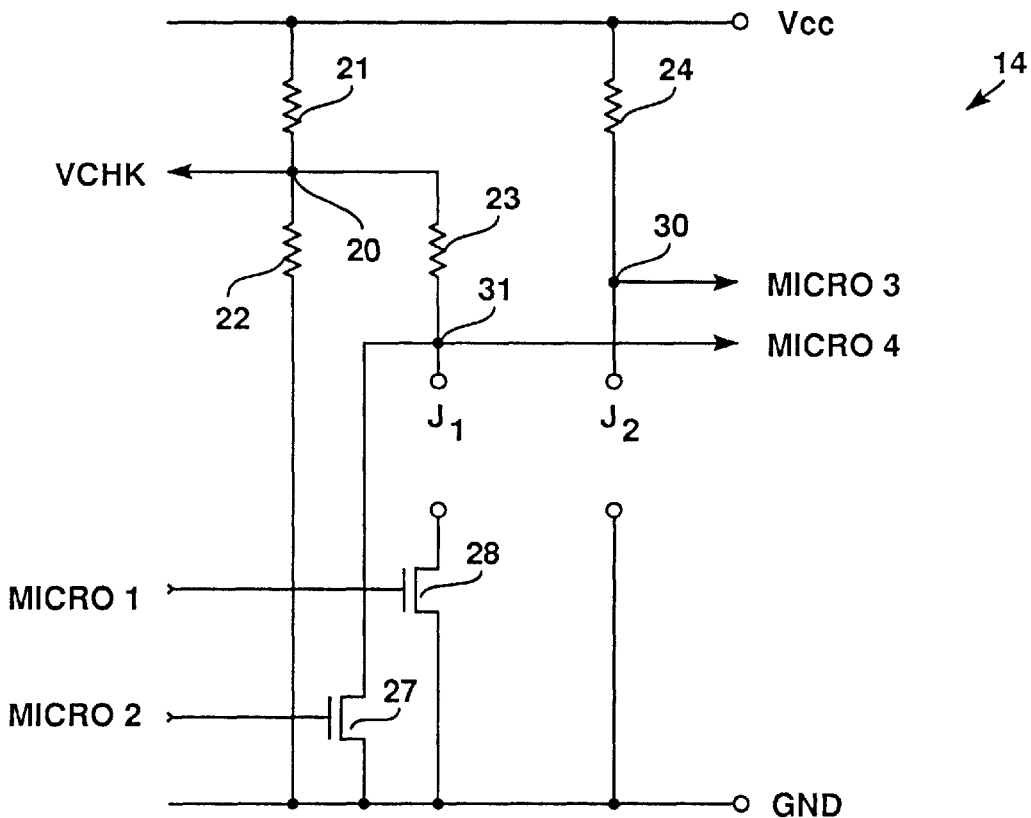
FIG. 2 is a detailed circuit schematic diagram of the adapter circuit utilized in one embodiment of the present invention.

With reference now to FIG. 2, there is shown a circuit schematic diagram of adapter circuit 14 for a current embodiment of the present invention. Circuit 14 produces the voltage $V_{CHK}$, supplied to reset generator 15, at an internal node 20. Node 20 is coupled to the positive supply potential, $V_{CC}$, through resistor 21, and to ground through resistor 22. Resistors 21 and 22 create a voltage divider network to generate the $V_{CHK}$ voltage at node 20.

In addition, resistor 23 is shown being coupled between node 20 and node 31 of circuit 14. Node 31 is selectively coupled to ground through field-effect device 27. Node 31 can also be jumpered (i.e., electrically connected) through jumper connection $J_1$ to ground via field-effect device 28. Field effect devices 27 and 28 both comprise ordinary n-channel semiconductor transistors. The gates of devices 27 and 28 are coupled to receive signals from processor 17 via lines MICRO$_2$ and MICRO$_1$, respectively.

A second jumper connection $J_2$ is also shown between node 30 and ground. Resistor 24 is coupled between node 30 and the supply potential $V_{cc}$. Nodes 30 and 31 are also coupled to processor 17 via lines MICRO$_3$ and MICRO$_4$, respectively.

Adapter circuit 14, illustrated in FIG. 2, permits a user to select one of four operating modes for the disk drive system. Table 1, shown below, illustrates the possible modes of operation in the current embodiment.

TABLE 1

| MODE | J1/MICRO 4 | J2/MICRO 3 |
|---|---|---|
| 5 Volt Only | In/Low | In/Low |
| 5 Volt Adaptive | In/Low | Out/High |
| 3 Volt Only | Out/High | In/Low |
| 3 Volt Adaptive | Out/High | Out/High |

In the "5 Volt Only" mode of operation, the disk drive system operates as a conventional system. In this mode, a reset signal is generated by reset generator 15 when the power supply voltage, $V_{cc}$, drops below a certain voltage level (e.g., 4.2 volts) appropriate for a 5.0 volt system. This produces a corresponding $V_{CHK}$ voltage at node 20 of circuit 14, as determined by the resistor divider formed by resistors 21 and 22. For example, a $V_{CHK}$ voltage of approximately 2.0 volts occurs when the voltage supply $V_{cc}$ drops below 4.5 volts. The 2.0 voltage level for $V_{CHK}$ is used by reset generator 15 to reset or otherwise disable the system. If $V_{CHK}$ is greater than 2.0 volts, the drive is allowed to operate normally; whereas if $V_{CHK}$ is less than 2.0 volts, the drive is held in a reset state. Reset generator 15 may comprise an ordinary analog comparator which compares the voltage $V_{CHK}$ to a reference level.

In the "5 Volt Adaptive" mode of operation, the disk drive system is initially powered up utilizing the reset voltage determined as in the "5 Volt Only" mode of operation. Special commands, however, from processor 17 allow the user to reconfigure the drive such that the "3 Volt Only" mode reset and seek parameters can be selected. In this manner, selecting the 3 volt reset value allows the drive to operate at reduced supply voltages appropriate for a 3.0 volt disk drive system. Note that this is well below the expected operating range of a 5.0 volt system.

Thus, the adaptive mode can be used to extend the operation of a portable computer system as the battery decays. In such a situation, the supply voltage level at which the entire system shuts down is adapted by the system itself. This eliminates the possibility of the drive resetting itself prematurely. In other words, the disk drive system of the present invention reconfigures itself and utilizes the reset and seek parameter appropriate for a reduced supply potential.

In the current embodiment the instantaneous operating potential $V_{cc}$ is monitored by processor 17 via lines MICRO₃ and MICRO₄ coupled to nodes 30 and 31, respectively. The same connections also allow processor 17 to determine how adapter circuit 14 has been configured. That is, sensing nodes 30 and 31 allow processor 17 to determine which of the four possible modes of operation have been selected based on the configuration of jumpers J₁ and J₂.

In the "3 Volt Only" mode of operation, the available power for seeking and accessing data is considerably less; thereby implementing a low-power seek mode. In addition, the commands that can be utilized to reconfigure the seek and reset parameters do not have to be issued to the drive system upon power up. Instead, these commands could be issued after a low battery condition, or any other appropriate input, was detected.

It should be appreciated that the "3 Volt Only" mode of operation is similar to the "5 Volt Only" mode of operation, with the exception that the reset and seek parameters are specifically defined in the "3 Volt Only" mode for 3 volt operation. This mode can be selected in systems that operate at 5 volts, but the seek performance is not as good as in the "5 Volt Only" mode since the seek parameters are adjusted based on expectations of lower operating currents. Obviously, the advantage of using the "3 Volt Only" mode of operation in a 5.0 volt system is that a lower reset voltage can be maintained.

In the "3 Volt Adaptive" mode of operation, the disk drive system is initially powered with the "3 Volt Only" set of seek and reset parameters. Special commands are then invoked so that the system can instruct the drive to check the value of the supply potential, and, if possible, use the "5 Volt Only" seek parameters. This permits optimized disk drive performance. These special commands are generated by processor 17, or some other suitable logic device.

As described earlier, the signal lines MICRO₁ and MICRO₂ are controlled by processor 17. Signal lines MICRO₃ and MICRO₄ permit processor 17 to determine how the user drive is configured. For example, if processor 17 determines that both jumpers J1 and J2 are out—i.e., an open circuit between node 30 and ground, and node 31 and transistor 28—then processor 17 knows that the "3.0 Volt Adaptive" mode of operation has been selected. Under this condition, the drive is initially powered to the lowest possible $V_{cc}$ level. However, if processor 17 senses the supply power level rising to approximately 5.0 volts, then processor 17 can employ faster seek and reset parameters. Thus, the adaptive modes grant the controlling logic device the freedom to reconfigure the seek and reset parameters depending upon the current in operating supply potential. The end result is that disk drive performance is optimized for the current operating supply potential, whatever that may be.

Note that field-effect devices 27 and 28 allow the switching of the voltage reset values based on the configuration of the jumper switches defined previously. For example, when MICRO₁ and MICRO₂ are at a logical low level (regardless of the jumper configuration) the reset voltage is established at a 5.0 volt level. When MICRO₂ is high (regardless of the jumper configuration) the reset voltage is established consistent with a 3.0 volt power supply level. It is appreciated that if these later features are undesirable, that devices 27 and 28 could be replaced by other switching devices, or either a short circuit or open circuit to provide "3V Only" and "5V Only" modes of operation. It should be further understood that MICRO₁ and MICRO₂ can be supplied by a logic source other than processor 17. Similarly, lines MICRO₃ and MICRO₄ may act as inputs to a logic circuit other than processor 17 to allow determination of the jumper configuration.

What is claimed is:

1. A magnetic recording system comprising:

a battery providing a supply voltage ranging from a first to a second operating voltage;

a disk drive for operation from said supply voltage, said disk drive operating in accordance with a plurality of seek parameters;

a circuit for generating a first potential at a first node in response to a first digital signal and a second potential at said first node in response to a second digital signal, said circuit configuring said disk drive in first and third modes of operation compatible with said first operating voltage, and second and fourth modes of operation compatible with said second operating voltage, wherein said first operating voltage is larger than said second operating voltage;

a reset generator coupled to said first node for providing a reset signal to said disk drive when either said first or second potentials at said first node are less than a predetermined potential;

a processor coupled to said circuit and said disk drive for producing said first digital signal when said supply voltage approximates said first operating voltage and said second digital signal when said supply voltage approximates said second operating voltage, said processor providing a first set of said seek parameters to said disk drive when said disk drive is configured in said first mode of operation and for selecting a second set of seek parameters when said disk drive is configured in said second mode of operation, said processor monitoring said supply voltage when said disk drive is configured in said third and fourth modes of operation such that when said supply voltage drops from said first operating voltage to said second operating voltage and said disk drive is configured in said third mode of operation, said processor providing said second set of seek parameters to said disk drive;

when said supply voltage rises from said second operating voltage to said first operating voltage and said disk drive is configured in said fourth mode of operation, said processor providing said first set of seek parameters to said disk drive;

wherein said first set of parameters optimize the performance of said disk drive when said supply voltage is equal to said first operating voltage, and said second set of parameters optimize the performance of said disk drive when said supply voltage is equal to said second operating voltage;

wherein said circuit further comprises a plurality of nodes selectively connected to provide a programmable signal coupled to said processor, said programmable signal defining said first, second, third and fourth modes of operation for said disk drive;

wherein said plurality of nodes comprises second, third, fourth and fifth nodes; and, wherein said circuit comprises:

a first resistor coupled between said supply voltage and said first node;

a second resistor coupled between said first node and said fifth node;

a third resistor coupled between said first node and said second node;

a fourth resistor coupled between said supply voltage and said third node;

a first field-effect device coupled between said fourth node and said fifth node;

a second field-effect device coupled between said second node and said fifth node, the gates of said field-effect devices being coupled to said first and second digital signals of said processor to control the conductivity therein;

said second and third nodes providing said programmable signal.

2. An apparatus comprising:

a disk drive;

a battery for supplying a supply voltage to the disk drive; and a logic device for detecting the supply voltage and controlling a mode of operation of the disk drive in response to the supply voltage;

wherein when the supply voltage is greater than a first predetermined voltage said disk drive operates in a high-power mode of operation;

wherein when the supply voltage is greater than a second predetermined voltage and less than the first predetermined voltage said disk drive operates in a low-power mode of operation;

wherein when the supply voltage is less than the second predetermined voltage the disk drive is disabled; and wherein the disk drive, when in both the high-power and low-power modes of operation, performs write and read functions.

3. The apparatus of claim 2 wherein the disk drive is dynamically switched from a high-power mode of operation to a low-power mode of operation.

4. The apparatus of claim 2 wherein the disk drive is switched from a high-power mode of operation to a low-power mode of operation without user intervention.

5. The apparatus of claim 2 wherein the disk drive includes a first set of seek parameters in the high-power mode of operation and a second set of seek parameters in a low-power mode of operation, the first set of seek parameters providing faster access times to a disk of the disk drive than corresponding second set of seek parameters.

6. The apparatus of claim 2 wherein the disk drive has a high performance level with respect to seek times in the high-power mode of operation and a lower performance level with respect to seek times in the low-power mode of operation.

7. The apparatus of claim 2 wherein the disk drive has a first set of seek and reset parameters in the high-power mode of operation and a second set of seek and reset parameters in the low-power mode of operation.

8. The apparatus of claim 2 wherein the disk drive is initially set in a high-power mode of operation by a user.

9. A portable computer system comprising:

a disk drive;

a rechargeable battery supply for supplying a supply voltage to the disk drive; and a logic device for detecting the supply voltage and controlling a mode of operation of the disk drive in response to the supply voltage;

wherein when the supply voltage is greater than a first predetermined voltage but less than a second predetermined voltage the disk drive operates in a low-power mode of operation;

wherein when the supply voltage is greater than the second predetermined voltage the disk drive operates in a high-power mode of operation;

wherein when the supply voltage is less than the first predetermined voltage the disk drive is disabled; and wherein the disk drive, when in both the low-power and high-power modes of operation, performs write and read functions.

10. The portable computer system of claim 9 wherein the disk drive is dynamically switched from a low-power mode of operation to a high-power mode of operation.

11. The portable computer system of claim 9 wherein the disk drive is initially set in a low-power mode of operation by a user.

12. An apparatus comprising:

a disk drive having at least four modes of operation;

a battery for supplying a supply voltage to the disk drive; and a logic device for detecting the supply voltage and controlling at least two of the four modes of operation of the disk drive in response to the supply voltage;

wherein in a first mode of operation the disk drive is initially configured with a first set of seek parameters and (1) when the supply voltage is greater than a first predetermined voltage the disk drive operates in accordance with the first set of seek parameters and (2) when the supply voltage is less than the first predetermined voltage the disk drive is disabled;

wherein in a second mode of operation the disk drive is initially configured with the first set of seek parameters and (1) when the supply voltage is greater than the first predetermined voltage the disk drive operates in accordance with the first set of seek parameters, (2) when the supply voltage is less than the first predetermined voltage but greater than a second predetermined voltage the disk drive operates in accordance with a second set of seek parameters and (3) when the supply voltage is less than the second predetermined voltage the disk drive is disabled;

wherein in a third mode of operation the disk drive is initially configured with the second set of seek parameters and (1) when the supply voltage is greater than the second predetermined voltage the disk drive operates in accordance with the second set of seek parameters and (2) when the supply voltage is less than the second predetermined voltage the disk drive is disabled;

wherein in a fourth mode of operation the disk drive is initially configured with the second set of seek parameters and (1) when the supply voltage is greater than the second predetermined voltage but less than the first predetermined voltage the disk drive operates in accordance with the second set of seek parameters, (2) when the supply voltage is greater than the first predetermined voltage the disk drive operates in accordance with the first set of seek parameters and (3) when the supply voltage is less than the second predetermined voltage the disk drive is disabled; and wherein, as long as the disk drive is not disabled, read and write functions may be performed by the disk drive in the first, second, third and fourth modes of operation.

13. The apparatus of claim 12 wherein a user selects between the first, second, third and fourth modes of operation.

14. The apparatus of claim 12 wherein the apparatus is a portable computer system.

15. The apparatus of claim 12 wherein the first set of seek parameters allow for faster access times to a disk of the disk drive than do the second set of seek parameters.

* * * * *